Aug. 28, 1928.
J. A. DAVEY ET AL
1,682,268
WOOD CUTTING APPARATUS
Filed Aug. 2, 1923   2 Sheets-Sheet 1
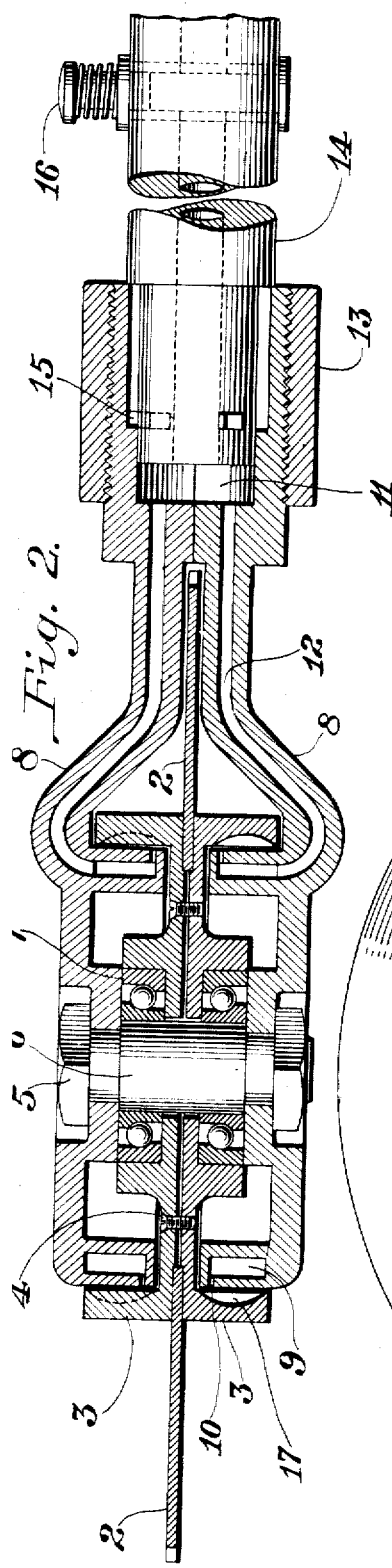
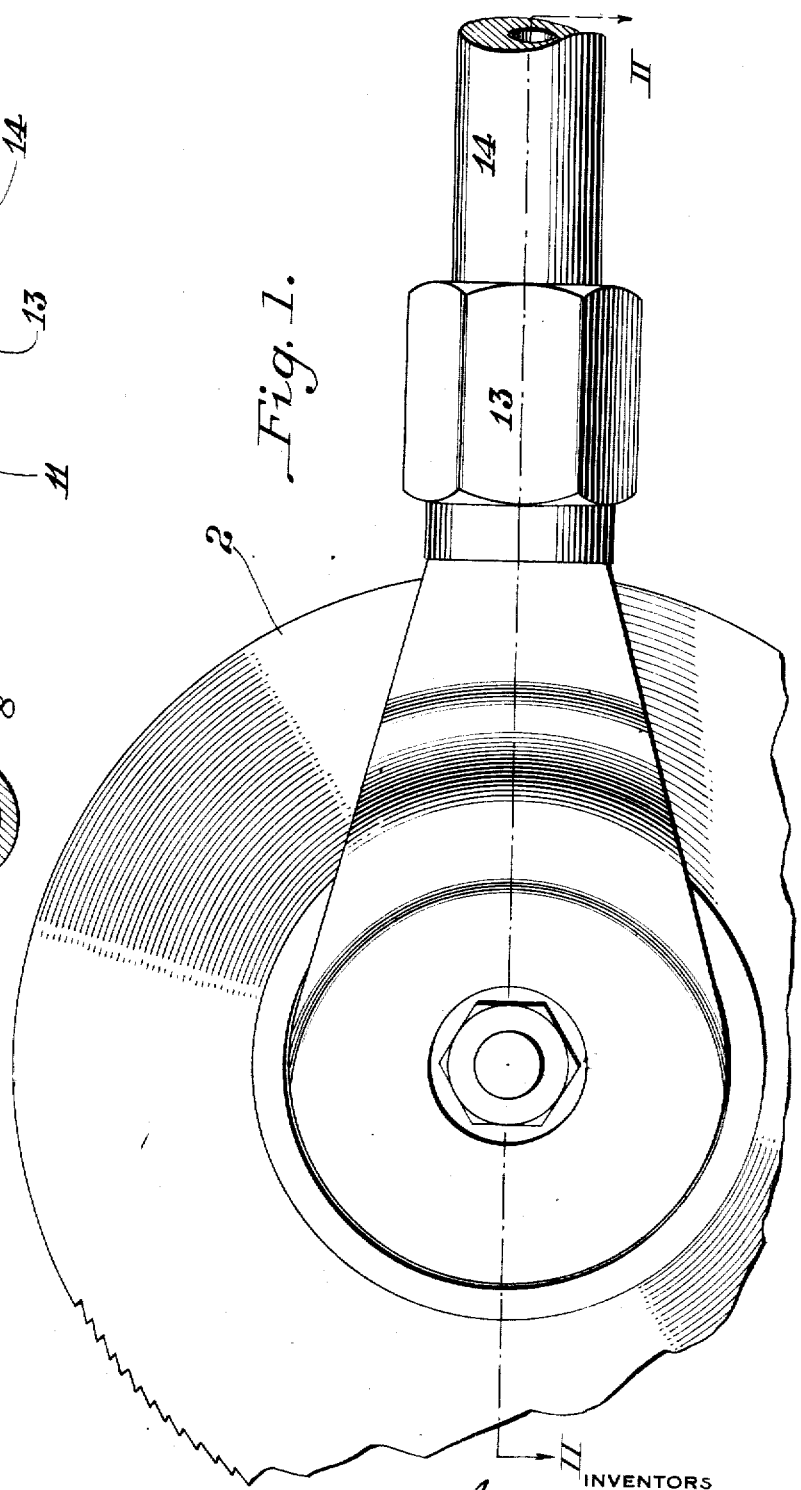
INVENTORS

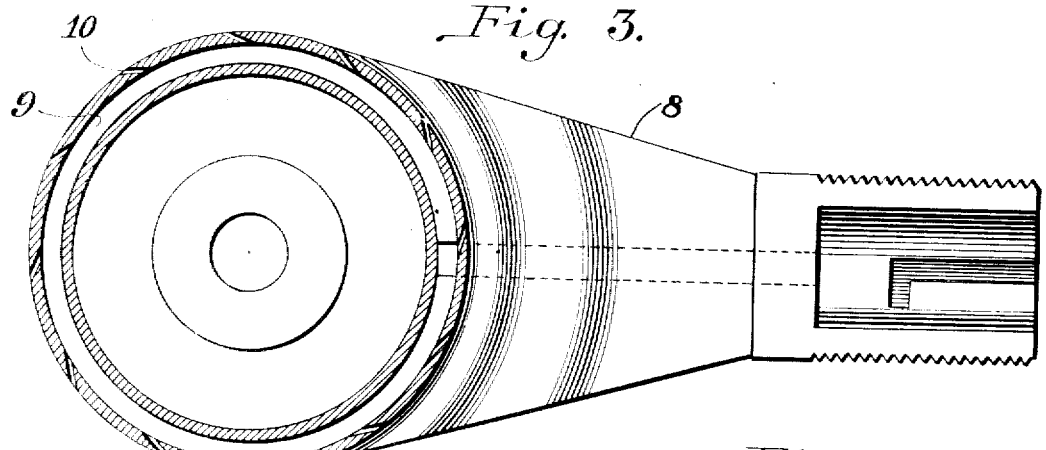
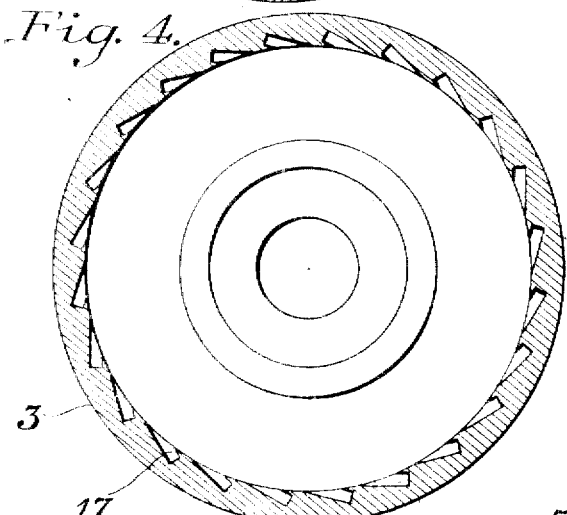
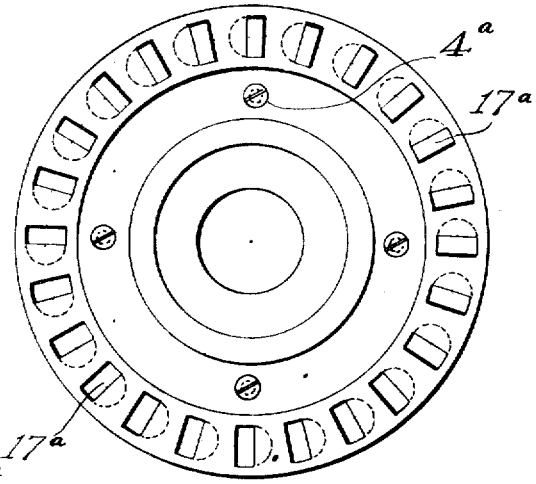
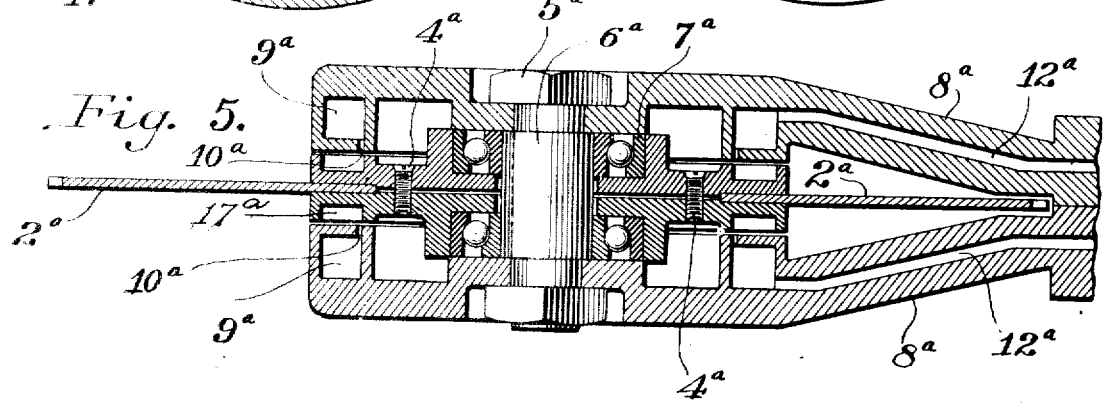

Patented Aug. 28, 1928.

1,682,263

UNITED STATES PATENT OFFICE.

JAMES A. DAVEY, OF SOUND BEACH, CONNECTICUT, AND PAUL H. DAVEY AND CHARLES L. GAUGLER, OF KENT, OHIO; SAID GAUGLER ASSIGNOR OF HIS ONE-THIRD TO THE DAVEY TREE EXPERT COMPANY, OF KENT, OHIO, A CORPORATION OF OHIO.

WOOD-CUTTING APPARATUS.

Application filed August 2, 1923. Serial No. 655,264.

Our invention relates to wood cutting apparatus, and is particularly useful in apparatus for trimming trees and the like.

In trimming small tree branches, or even large limbs, it is highly desirable to work from the ground, if possible, not only for convenience but to avoid damaging the tree. We therefore provide a wood cutting tool carried on a support which may be readily manipulated from the ground, from a moving platform, or from an advantageous position in the tree. In any case, the long handle makes it very easy to reach ordinarily inaccessible portions of the tree. We preferably use a rotary cutting tool which is directly connected to a fluid turbine. The actuating fluid, preferably air, is supplied through the support and is controlled by the operator.

The cutting tool is preferably operated at exceedingly high speeds. A circular saw, for example, may be rotated at more than 15000 R. P. M., and at such speeds the gyroscopic effect of the rapidly rotating tool is sufficient to insure a straight cut when the tool is moved toward a tree branch. When the support is of any considerable length, the gyroscopic effect is particularly important, since the tool may otherwise be hard to control. With the high speed tool, however, the cutting head is steadily moved forward with little muscular effort and the tool tends to continue rotating in the same plane.

In the accompanying drawings illustrating the present embodiment of our invention,—

Figure 1 is a side elevation, partly broken away, of a cutting apparatus embodying our invention, the specific tool illustrated being a circular saw;

Figure 2 is a sectional view on the line II—II of Figure 1;

Figure 3 is a view, partly broken away, of one half of the cutterhead frame;

Figure 4 is a section through the rotor of the fluid turbine employed;

Figure 5 is a view similar to Figure 2 but showing a modified form of fluid turbine; and Figure 6 is a side elevation of the turbine rotor shown in the embodiment of Figure 5.

In the illustrated embodiment of our invention, a cutting tool 2 is supported between a pair of turbine rotors 3. These rotors are secured together by screws 4. A central pin 5 carrying a collar 6 and ball bearings 7, is provided to insure free rotation of the cutting tool and attached turbine rotors. The pin 5 is carried in two frame pieces 8, as best shown in Figure 2. These frame pieces each constitute a fluid header 9 having turbine nozzles 10, a half socket 11 for the cutting head support, and a fluid passage 12 leading from the socket 11 to the header 9. The members 8 are held together by the pin 5 and by a nut 13, and when assembled they form a complete socket for a handle or support 14.

A bayonet joint 15 or similar structure may be used to fasten the handle securely in the socket. The handle 14 may be sectional, if desired, and of any required length. The handle is made hollow to provide a passage for the turbine actuating fluid, and a spring closed valve 16 is provided adjacent the remote end of the handle for controlling the flow of actuating fluid. When the valve 16 is depressed, the fluid preferably air, passes through the support 14 and into the socket, from which it travels through the passages 12 into the air headers 9, and thence through the nozzles 10 to the turbine rotors 3. The rotors are provided with U-shaped buckets 17 and the nozzles 10 are at the inside of the rotors, as best shown in Figure 2. This is highly advantageous in an apparatus of this character, since the exhaust air readily passes out at the outside of the rotors 3 and serves to keep chips and dirt out of the cutting head.

The embodiment of Figures 5 and 6 is very similar to that of Figures 1 to 4, and similar parts have been given the same reference character with the letter "a" suffixed thereto. In this embodiment, however, the actuating fluid flows radially in the rotor instead of axially. It will be noted, however, that in both forms the air nozzles are near the inside of the apparatus and the air travels outwardly, thus finding a ready egress and insuring that no dust or chips can enter the working parts. It will be noted that the diameter of the rotor is at least as great as the diameter of the nozzle circle. This is of advantage since it provides a long torque arm and increases the angle through which any nozzle is effective for imparting energy to the rotor.

We have found that with this apparatus it is very easy to get speeds of from 15000 to 2500 R. P. M. At such high speeds the gyroscopic effect is very noticeable and is highly important in cutting tree branches or the like.

We provide a wood cutting apparatus of simple construction and high efficiency. The tool is readily taken apart for changing cutters, is very compact, and makes its own air connection when the handle is inserted in the socket. The air is controlled at a point remote from the cutting tool, and this is particularly desirable when a long handle or support is used. We do not restrict ourselves to the double turbine construction, as a single turbine may also be used, if desired, although the illustrated form gives exceptional power and balance.

While we have shown the preferred embodiment of our invention, it will be understood that the invention is not limited to the illustrated form but may be otherwise embodied within the scope of the following claims.

A specific form of the generic invention herin described and claimed is described and claimed in application No. 655,265 filed of even date herewith. (Patents 1,646,812 and 1,646,813.)

We claim:

1. A wood cutting apparatus including a single rotary cutting tool having a bucketed turbine rotor on each side thereof, the turbine rotors having a bucket circle of at least as large diameter as the nozzle circles, and the tool describing a circle of larger diameter than the bucket circles, substantially as described.

2. A wood cutting apparatus including a rotary tool and a pair of bucketed turbine rotors directly connected thereto, one on either side of the tool, and means for clamping the rotors together, said rotors being adapted to center and hold the tool when so clamped, the turbines having a bucket circle of at least as large diameter as the nozzle circle, substantially as described.

3. A wood cutting apparatus including a rotary cutting tool, a pair of turbine rotors, and means for clamping the rotors together, said rotors being adapted to center and hold the cutting tool when so clamped, substantially as described.

4. A wood cutting apparatus including a single rotary cutting tool having a bucketed turbine rotor on each side thereof, turbine nozzles, and a header for the nozzles, the turbine having a bucket circle of at least as large diameter as the nozzle circle and the tool describing a circle of larger diameter than the bucket circle, substantially as described.

5. A wood cutting apparatus including a pair of fluid actuated turbine rotors, a rotary tool directly connected thereto, housings for the rotors, and means for discharging the actuating fluid from one rotor in a direction opposite the direction of discharge of the fluid from the other rotor and away from the tool, substantially as described.

6. A wood cutting apparatus including a pair of fluid actuated turbine rotors, a rotary tool directly connected thereto, said rotors having U-shaped buckets, housings for the rotors, and means for discharging the actuating fluid from the turbines in the opposite directions and away from the tool between the housings and the rotors, substantially as described.

7. A wood cutting tool including a direct turbine driven cutter head and a separable frame therefor, the frame being in two parts adapted to carry the cutter between them when assembled, at least one of the parts containing turbine nozzles, substantially as described.

8. A wood cutting tool including a direct turbine driven cutter head, a separable frame therefor, and a handle, the frame being in two parts adapted to carry the cutter between them when assembled, at least one of the parts containing turbine nozzles, and the two parts forming a socket for the handle, substantially as described.

9. A wood cutting tool including a direct turbine driven cutter head, a separable frame therefor, and a handle, the frame being in two parts adapted to carry the cutter between them when assembled, at least one of the parts containing turbine nozzles, and the two parts forming a socket for the handle and having at least one port leading from the socket to the turbine nozzles, substantially as described.

10. Apparatus for cutting tree branches and the like, including a rotary cutting tool, means for directing and supporting the cutting tool by an operator remote from the tool, and turbine means operatively connected to the tool for rotating the tool at least 15000 R. P. M., substantially as described.

11. A wood cutting apparatus including a rotary cutting tool, a pair of turbine rotors clamped together whereby to center and hold the tool, a pair of frame members fitted around the rotors and having passages and nozzles therein for a turbine actuating fluid, and a shouldered bearing pin rotatably supporting the rotors and holding the frame members in spaced relation therewith, substantially as described.

12. Apparatus for cutting tree branches and the like, including a rotary cutting tool, a turbine operatively connected thereto, a plurality of nozzles for supplying actuating fluid to the turbine, and a pole for directing and supporting the cutting tool whereby it can be manipulated by an operator at a point remote from the tool, the turbine and tool constituting gyroscopic elements for steadying the tool as it is directed against the work, substantially as described.

13. The combination of a frame, a rotor having an annular depression with laterally-extending buckets therein, cutting means on the rotor, and pressure-fluid supplying means on the frame extending into said depression including nozzles close to the median plane of rotation of the rotor.

14. The combination of a frame, a rotor having annular depressions at opposite sides with laterally-extending buckets therein, cutting means on the rotor, and pressure-fluid supplying means on the frame including a set of nozzles in each of said depressions close to the median plane of rotation of the rotor.

15. The combination of a frame, a divided rotor having an annular bucket-forming depression about its axis, a circular tool clamped between the parts of the rotor, and pressure-fluid supplying means on the frame including nozzles close to the median plane of rotation of the rotor.

16. The combination of a frame, a divided rotor having annular bucket-forming depressions at opposite sides, a circular saw held between the parts of the rotor, and pressure-fluid supplying means on the frame including a set of nozzles in each of said depressions close to the median plane of rotation of the rotor.

17. The combination of a frame, a rotor thereon, cutting means on the rotor, a nozzle circle on the frame, a bucket circle on the rotor exterior to and of greater diameter than the nozzle circle the buckets and nozzles being substantially equal in number and equally spaced, and means for supplying actuating fluid to the nozzles.

18. The combination of a frame, a rotor thereon, cutting means on the rotor, bucket circles on the rotor at opposite sides of the median plane of rotation, nozzle circles on the frame for feeding actuating fluid to the buckets said bucket circles being exterior to and of greater diameter than the nozzle circles and the nozzles and buckets of coacting circles being approximately equal in number and equally spaced.

In testimony whereof we have hereunto set our hands.

JAMES A. DAVEY.
PAUL H. DAVEY.
CHAS. L. GAUGLER.

CERTIFICATE OF CORRECTION.

Patent No. 1,682,268.　　　　　　　　　　Granted August 28, 1928, to

JAMES A. DAVEY ET AL.

It is hereby certified that error appears in the printed specification of the above numbered patent requiring correction as follows: Page 1, line 106, for the number "2500" read "25000"; and that the said Letters Patent should be read with this correction therein that the same may conform to the record of the case in the Patent Office.

Signed and sealed this 8th day of January, A. D. 1929.

(Seal)

M. J. Moore,
Acting Commissioner of Patents.

extending buckets therein, cutting means on the rotor, and pressure-fluid supplying means on the frame extending into said depression including nozzles close to the median plane of rotation of the rotor.

14. The combination of a frame, a rotor having annular depressions at opposite sides with laterally-extending buckets therein, cutting means on the rotor, and pressure-fluid supplying means on the frame including a set of nozzles in each of said depressions close to the median plane of rotation of the rotor.

15. The combination of a frame, a divided rotor having an annular bucket-forming depression about its axis, a circular tool clamped between the parts of the rotor, and pressure-fluid supplying means on the frame including nozzles close to the median plane of rotation of the rotor.

16. The combination of a frame, a divided rotor having annular bucket-forming depressions at opposite sides, a circular saw held between the parts of the rotor, and pressure-fluid supplying means on the frame including a set of nozzles in each of said depressions close to the median plane of rotation of the rotor.

17. The combination of a frame, a rotor thereon, cutting means on the rotor, a nozzle circle on the frame, a bucket circle on the rotor exterior to and of greater diameter than the nozzle circle the buckets and nozzles being substantially equal in number and equally spaced, and means for supplying actuating fluid to the nozzles.

18. The combination of a frame, a rotor thereon, cutting means on the rotor, bucket circles on the rotor at opposite sides of the median plane of rotation, nozzle circles on the frame for feeding actuating fluid to the buckets said bucket circles being exterior to and of greater diameter than the nozzle circles and the nozzles and buckets of coacting circles being approximately equal in number and equally spaced.

In testimony whereof we have hereunto set our hands.

JAMES A. DAVEY.
PAUL H. DAVEY.
CHAS. L. GAUGLER.

CERTIFICATE OF CORRECTION.

Patent No. 1,682,268.                    Granted August 28, 1928, to

JAMES A. DAVEY ET AL.

It is hereby certified that error appears in the printed specification of the above numbered patent requiring correction as follows: Page 1, line 106, for the number "2500" read "25000"; and that the said Letters Patent should be read with this correction therein that the same may conform to the record of the case in the Patent Office.

Signed and sealed this 8th day of January, A. D. 1929.

(Seal)

M. J. Moore,
Acting Commissioner of Patents.